United States Patent Office 3,088,113
Patented Apr. 30, 1963

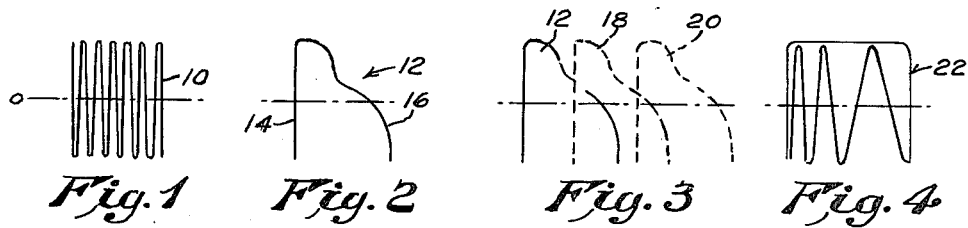
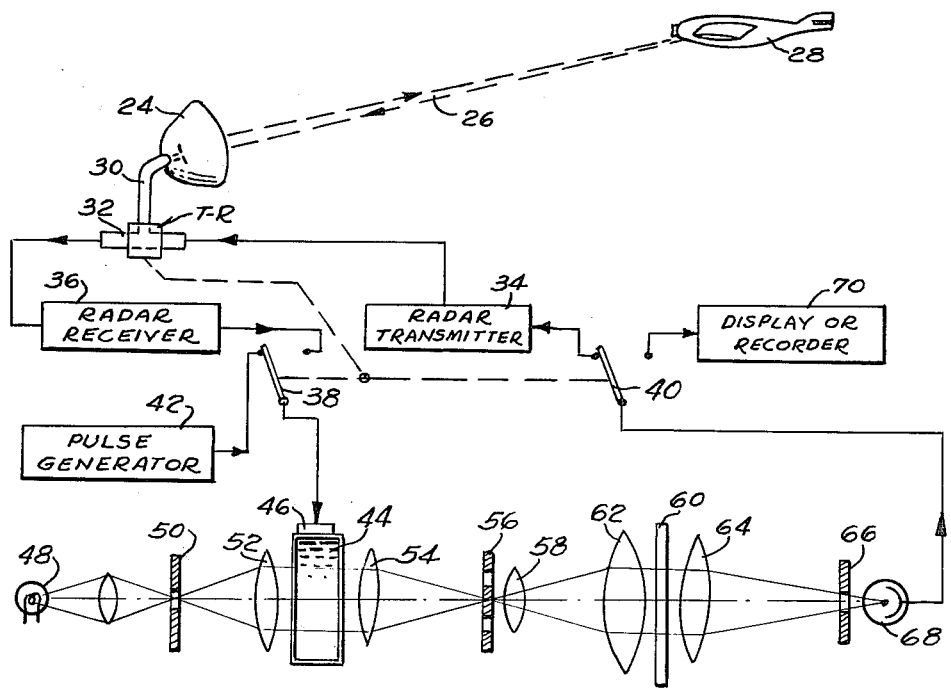
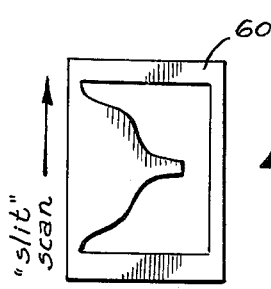
A. H. ROSENTHAL
INVENTOR.

3,088,113
CORRELATION SYSTEM FOR RADAR
AND THE LIKE
Adolph H. Rosenthal, Forest Hills, N.Y., assignor to Fairchild Camera and Instrument Corporation, a corporation of Delaware
Filed June 27, 1958, Ser. No. 745,080
2 Claims. (Cl. 343—17.1)

The present invention has to do with communication systems, especially electromagnetic wave reflection systems as employed for object detection, ranging and the like. The invention has for its main object improvements in such systems which will provide greater immunity to jamming by enemy signals, as well as greater reliability of the system in the presence of noise or interference from any cause. Fundamentally, the invention provides ways and means by which the technique of signal correlation, in the mathematical sense in which that term is employed in modern information and communication theory, can practically be applied to the enhancement of the reliability or integrity of radar systems employing signal reflection. While the invention will be disclosed herein, by way of clarifying example, as applied to such radar systems, it will be understood by those skilled in communications that the invention can also advantageously be employed in other reflected wave systems such as echo sound-ranging, underwater or sonar systems, and so on. Moreover, the invention has wide application in the machine computation of correlation functions generally.

It has been known for many years that, as a mathematical proposition, it is possible to establish correlation functions as between any two time series, either periodic or non-periodic, and that if two such time series are subjected to the correlation process, their likenesses (or differences) can be expressed as a resultant or correlation function which, in the case of actual correlation, is a function of $t$, which may be considered the value, in units of time, of the phase displacement between the two original time series. The development of this discipline by N. Wiener and others, and a brief explanation of its application to non-periodic time series of a random nature not susceptible to algebraic analysis, are given in the U.S. patent to Lee and others, No. 2,643,819, of June 30, 1953. An instance of the application of the theory to those specific time series employed in pulse reflection techniques, is described in the U.S. patent to Guanella, No. 2,253,975, of August 26, 1941. Since each pulse or burst of wave energy in such a system is, in effect, statistically compared with its reflected counterpart to establish the desired correlation function, and hence the value of $t$ which corresponds to the total travel time (which is twice the radar range when converted to time units), it is a first requirement that the time-series represented by the transmitted pulse shall be non-repetitive within at least its own length. A second essential requirement is that the apparatus shall be capable of effecting the necessary product or multiplication operation between the two time series (the transmitted and reflected pulses) for various values of phase displacement therebetween, and to integrate the continuing product for a sufficient time to establish a unique maximum value for the indicated $t$.

The present invention provides implementation for, and a method of, carrying out the necessary correlation techniques, so as to provide adirect indication and/or display of the pulse travel time, and with a minimum of sensitivity to intentional or adversary jamming, or to noise from any source. Moreover, the system of the invention provides these advantages with very simple equipment considering the results achieved, and it permits rapid and frequent change of the nature of the pulse shaping employed. It additionally permits the handling of relatively extended bandwidths with good linearity of response over the entire range employed.

While the system of the invention can be carried out by a variety of specifically different combinations of equipment, some of which will be mentioned hereinafter, it is fundamentally characterized by the use of an ultrasonic light-modulating cell as the source of the signal-shaping employed to convert the usual radar pulse which is transmitted to the target, into an arbitrary or random time series; moreover, either the same or an identically operating ultrasonic light-modulating cell is employed to carry out the continuous correlation of the returned or echo pulses (in reality, the entire received signal presumptively including the echo pulses) with the transmitted pulses. In other words, the ultrasonic light-modulating cell operates not only as the shaper, but also as the essential product forming and storage or time-delay device which is required to effectuate the correlation process. Since the ultrasonic light valve can provide, in equipment of practical size, the necessary magnitude of storage time or delay time appropriate to normal radar ranges and pulse repetition intervals, it will be seen that its employment in this combination permits results which are especially advantageous as compared, for example, with the use of other types of light valves or scanning means requiring separate and independent, although cooperative, delay or storage devices.

With the above distinctions in mind, the invention itself, and the preferred manner of practicing the same, will best be understood by referring now to the following detailed specification thereof, taken in connection with the appended drawings, in which:

FIGURE 1 is a graphic and idealized illustration of a typical radar pulse of the conventional or square-wave shape.

FIGURE 2 is a similar illustration of an amplitude-modulated radar pulse as shaped and transmitted in accordance with one form of the present invention.

FIGURE 3 is still another view of a pulse such as in FIGURE 2, showing superimposed thereon, in different phase positions, the outline of an echo pulse corresponding thereto.

FIGURE 4 is a graphical representation of a pulse employing a frequency modulation of the carrier wave to provide the non-repetitious time series required for operation of the invention.

FIGURE 5 is a schematic view, partly in the form of a block diagram, of one preferred embodiment of the invention as applied to a radar ranging installation.

FIGURE 6 is a view in elevation of one form of amplitude-modulating mask employed in the system of FIGURE 5.

Figure 7:
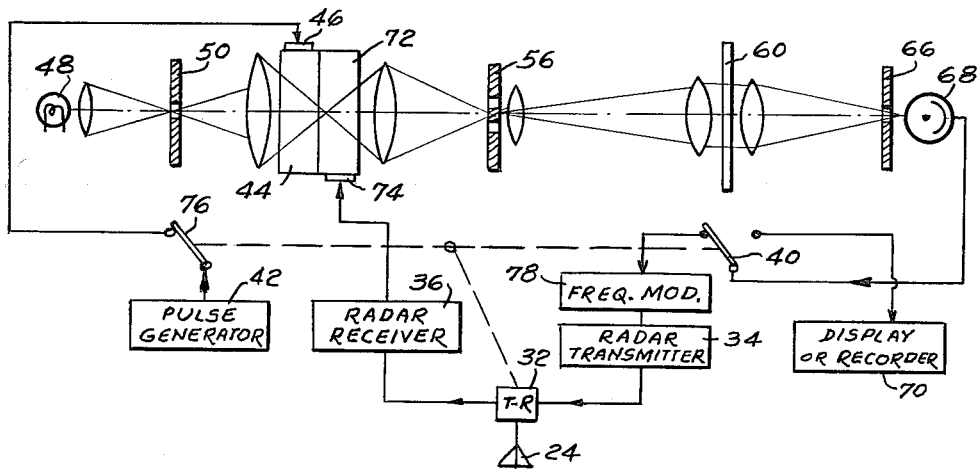
FIGURE 7 is a simplified schematic view of another embodiment of the invention.

As has been indicated, the ultrasonic light-modulating cell which is an essential element of the present invention, is in itself well known. In order to avoid encumbering the present disclosure with its technology, reference is hereby made to U.S. Patent No. 2,797,619, issued July 2, 1957, to A. H. Rosenthal, and in which are described a variety of such cells with particular reference to configurations which permit obtaining desirable delay, travel or scan intervals especially for radar display purposes. The disclosure of that patent, and of those cited therein, is incorporated herein by this reference. Briefly, all that need here be said is that such cells employ the phenomenon of propagation of a wave of compressional energy, or alternate states of relative compression and rarefaction, in a suitable liquid, to produce the optical equivalent of a travelling slit or scan aperture, due to the diffraction of light therein. In some combinations, two such cells are employed, at different points in an optical system. In the present invention, the cell (or cells) forms not only the light-modulating device by which the desired shape characteristic is imparted to the radar pulse, but at the same time constitutes a portion of the product-forming or intermodulation and integrating device needed to effectuate the correlation function.

FIGURE 1 of the drawings illustrates, for comparison purposes, a typical square shape form of radar pulse 10, constituted by several complete cycles of an otherwise unmodulated high frequency wave to be propagated in space or in any other medium; compressional wave pulses in elastic media, such as in sonar applications, are typically of the same general shape. As is well known, a pulse of the form shown in FIGURE 1 is subject to noise, and especially to enemy jamming; all that is necessary to prevent the return of useful information being the emission of sufficiently numerous similar pulses, either randomly related as to time, to give an erroneous indication of travel time, and hence range, or so varied in time phasing as to make the user of the equipment unable to discriminate between the echoes of his own transmitted pulses and the jamming pulses.

FIGURE 2 of the drawings indicates, on the contrary, the envelope of a pulse shape of one form, not a square shape, suitable for use in an amplitude-modulated version of the present invention. In this pulse, designated generally by numeral 12, the initial amplitude is indicated by the sharply rising front 14, which then drops off along the shaped curve 16 to terminate the pulse. It will be seen that the amplitude of this pulse varies continuously during the pulse length, in any arbitrary manner which satisfies the requirement of randomness as indicated above. FIGURE 3 indicates, in a crude and geometrical fashion, the effect of the auto-correlation process. If, again, numeral 12 designates the pulse shape as originally transmitted, and numerals 18 and 20 designate the similarly shaped echo pulses produced by the reflection from a distant object of the pulse 12, it will be obvious that by properly delaying the original pulse for any value of total travel time, or phase displacement of the original and the echo pulses, a composite output can be derived which will be maximized due to the multiplicative superposition of the original and return pulses. Of course, the actual travel time is determined by the target location, but in the correlation process the product function is in effect inspected for various effective phase displacements, by varying the phase of superposition artificially by a variable delay means. Thus, the maximum output or product value can be determined in terms of the artificial phase delay required for maximization, and the range calculated in terms of this delay time. It is apparent that a random shape is needed to yield an unambiguous or unique value of travel time, and also that the delay required to be available must be variable over all values corresponding to the limits of range of the radar or other ranging or detection apparatus.

At this point, it will probably be helpful to differentiate the present technique from those radar systems which obtain improved signal-to-noise characteristics by mere integration of successively received echoes. In such systems, the train of received pulses is applied to a tapped delay line or the like, the pulses normally being of the simple square shape as indicated in FIGURE 1. If the delay interval between successive tapping points corresponds to the (usually fixed) pulse repetition interval of the radar, successive echoes from the same target can be made to reinforce one another by a simple process of integration. In such cases, improvement over random noise is of course obtained, but no improvement as against the more sophisticated artificial pulses returned from adversary jamming devices. Contrariwise, the present invention provides both improved discrimination against noise and other random interference, and improved rejection of enemy jamming in the form of pulsed interference or noise. Moreover, the invention permits the characteristic "shape" of the employed pulses to be varied rapidly, without apparatus complications or circuit changes, as will appear.

FIGURE 4 of the drawings illustrates in schematic style one form of frequency-modulated pulse whose envelope is indicated by numeral 22. It will be observed that here again the quality of randomness is obtained, although the pulse envelope may be of constant amplitude. Though not specifically a feature of the present combination invention, use may be made, in the case of the frequency modulated pulse, of the frequency-modulated-color display system described and claimed in a copending application, Serial No. 415,055, filed March 9, 1954 in the name of A. H.Rosenthal, now Patent No. 2,943,315 of June 28, 1960.

A complete system employing the principles of the invention is illustrated schematically in FIGURE 5 of the drawings. Numeral 24 designates a known and typical form of radar antenna suited to the frequencies employed and to the purposes of the radar equipment. The outward and reflected pulse energy are indicated by dash lines 26, the reflection in this case being assumed to occur at an aircraft indicated at 28. The antenna feed is conventionally indicated at 30, terminating in the "magic tee" or T-R box 32. Obviously, any equivalent or suitable switching substitute can be employed for this component, and the system can equally well utilize separate transmitting and receiving antennas. In any event, the successive pulses of radiated energy are obtained from a conventional radar transmitter 34. The returned pulses, along with any noise or jamming energy, are received by radar receiver 36. The transmitting and receiving functions are controlled in alternation by any suitable switching system, shown graphically in FIGURE 5 as a pair of two-position switches 38 and 40 ganged for the purpose, and with the T-R switch. A controlling pulse generator 42, of suitable type, is connected by switch 38, in the transmit switch position shown in the drawing, to apply periodic pulses of energy to the ultrasonic light-modulating cell 44, via crystal transducer 46 in the manner known per se. A detailed description of the cell is deemed unnecessary, except to state that the pulse energy propagated across the liquid in the cell produces the local diffraction effect which, in connection with the aperture stops employed in the optical system, causes a flying spot type of scansion to occur along the ultrasonic propagation direction and its optical image produced by lens 58 at 60.

In particular, the apparatus includes a light source 48, illuminating an aperture or stop plate 50 preferably providing a narrow slit aperture whose length lies perpendicular to the plane of the drawing, collimating and decollimating lenses 52 and 54 for the cell 44, a complementary or bar aperture plate 56, suitable relay lens 58, shaped mask 60 and field lens system 62, 64, and a final slit aperture stop plate 66. The occurrence of a diffracting wave train along cell 44 will cause the effective scanning of the light beam across mask 60 and produce from photo cell 68 an electrical output constituting the time series corresponding to the variation in mask transparency or transverse aperture along its length in the scan direction. It is then sufficient either to vary the transparency or to shape the clear area of the mask to obtain any desired or suitable shape in the output from photo cell 68. A mask 60 providing a pulse shape similar to that illustrated in FIGURE 2 is shown in elevation in FIGURE 6 of the drawings, the shape being symmetrically duplicated for a reason peculiar to this simple set of optics, as will be described.

The electrical pulse output from photocell 68, during the transmit time when switch 38 connects the pulse generator 42 to the light-modulating cell 44, is directed by switch 40 to the radar transmitter 34, to modulate its amplitude or frequency and thus cause it to feed a suitably shaped high frequency pulse to antenna 24. Switches 38 and 40 together with T-R switch 32 are then shifted to their opposite "receive" positions, by any suitable means synchronized with or controlled by the pulsing equipment of the radar, so that the incoming or received energy, including any presumptive echoes from targets, is applied in turn to the cell 44. The received energy thus also produces the scan operation inherent in the cell 44 and its optical system. Actually, the time series corresponding to the received energy is optically superimposed, as a travelling wave train, upon the same mask 60 as was used to produce the outgoing pulse. This superposition of a travelling "image," as it were, of the received energy, upon a stationary image corresponding to the originally emitted pulse, provides the range or gamut of phase displacements or variable delay in the time sense between the emitted and returned energy. As is well known, the mathematical effect of scanning a mask by a distributed image carrying a varying intensity of illumination, is the integral of the products of the instantaneous values corresponding to the two functions defining the variation in distributed image illumination and the variation in mask transparency. It follows that the apparatus described will produce an output, from cell 68, which is a time series representing successive values of the correlation function desired, and that the time position of any significant maximum thereof will represent the travel time of the emitted and returned pulse of the radar system. In the right-hand position of switch 40, this information is conducted to the display or recording equipment 70 of known or any desired type. The integration of the product is effected over the length of the ultrasonic cell 44, and the integration time may amount to about 100 microseconds for a cell about 6 inches long.

The necessity for multiplication, and for integration of the continuing product, is apparent from an inspection of the correlation integral:

$$C = \int f(T) \times f(T+t) dt$$

It will have been observed, from a consideration of the arrangement just described, that since the waves corresponding to the transmitted and any reflected pulse energy are applied to the same end of the cell 44, actual superposition of the pulse shapes could not occur unless either an optical inversion (in the sense of from above to below the longitudinal axis of FIGURE 5) is provided, or unless the mask shape happens to be symmetrical about that axis. A symmetrical mask shape is therefore assumed for mask 60 in this case, as is shown more clearly in FIGURE 6. It would also be feasible to obtain the effect of direction inversion, vertically in the plane of the drawing of FIGURE 5, by a suitable mirror switch arrangement between cell 44 and mask 60. However, a much simpler arrangement is possible, and will be described below. It is to be noted that the symmetrical mask shape of FIGURE 6 does not violate the requirement for randomness in the time function within the range as defined above.

FIGURE 7 of the drawings illustrates an arrangement which inherently provides the necessary effective reversal of scan direction as between the outgoing and returning pulses. In this figure, the same reference numerals have been used, so far as possible, to designate the same elements as in FIGURE 5. Thus, the light source is indicated at 48, and the aperture stops may be as before. Now, however, in addition to the ultrasonic cell 44 with its driving transducer 46, there is provided a second such cell 72, arranged with its transducer 74 on the opposite end from transducer 46. A switch 76, generally cognate to switch 38 of FIGURE 5, again operates to connect the pulse generator 42 to the cell 44, but in this case cell 72 may be permanently driven from the receiver 36. Switch 76 may be dispensed with in many cases of simple pulse shapes, leaving 42 and 46 permanently connected. Switch 40 is again ganged with the pulse generator control switch, and with the T-R switch, and operates the radar transmitter 34 as heretofore described. Since the scan pattern derived from receiver 36 will travel in cell 72 in the reverse direction from that in cell 44, direct comparison of shapes derived from the mask 60 is possible. FIGURE 7 also illustrates a frequency-modulated form of pulse shaping, the frequency modulator 78 being of well known or any desired construction as employed in frequency-modulated pulse radar systems. In other respects, the arrangement of FIGURE 7 operates just as does that of FIGURE 5.

Figure 8:
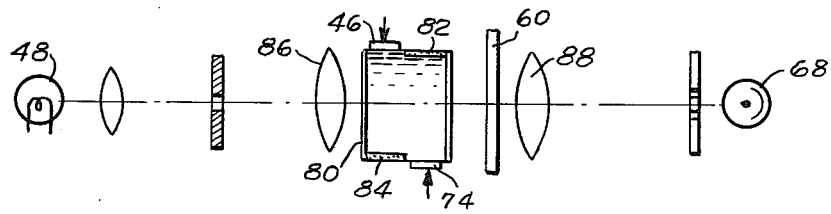
FIGURE 8 is still another, and even more simplified showing, of a form of the invention and its application.

FIGURE 8 of the drawings illustrates other useful modifications of the same general apparatus. Thus, in this instance, the two cells of FIGURE 7 have been combined in a single envelope as at 80, the parallel but oppositely directed travel paths lying in the same body of liquid. Absorbent devices of known kind, designated 82 and 84, also present in the other embodiments, are provided to eliminate multiple reflections and mutual interference of the travelling waves. The optical system here is somewhat simplified by placing the cell and mask devices in the same collimated light region between lenses 86 and 88.

Figure 9:
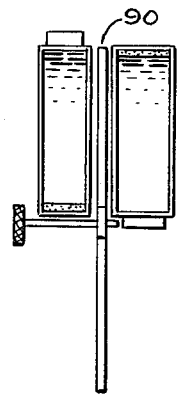
FIGURE 9 is a side elevation of one form of shape-changing mask, showing its relationship to an ultrasonic light-modulating cell assembly.

FIGURE 9 of the drawings illustrates schematically a form of cell assembly in which the mask is positioned between the two cells. Additionally, this figure illustrates the possibility of providing for rapid change of the mask shape, as by mounting several such shapes upon a disk 90 arranged for rotation to bring any desired mask into position. A sliding multiple-mask assembly could also be employed. The ability to change the pulse shape on short notice gives, of course, another degree of antijamming protection, or will permit an optimum mask shape to be employed for each environmental condition. It will be obvious from what has been said that changing of mask shapes could also be accomplished by suitable selecting mirrors or the like, rather than by physically moving the mask aperture devices.

In many applications the transmitted pulse can be given a noise shape by using a mask shape representing noise, e.g., obtained by randomly distributed coarse particles, like photographic grain.

While the invention has been disclosed herein in connection with certain presently preferred embodiments, it will be obvious to those skilled in this art that various other changes and modifications in the invention can be made without departing from the inventive concept; it is therefore not intended to limit the invention to the foregoing details, except as may be required by the true scope and spirit of the appended claims.

What is claimed is:

1. In pulse-echo apparatus for the detection and/or ranging of remote objects, and of the type including pulse emitting means and apparatus for receiving echo pulses, the improvement which comprises a shaped aperture mask, ultrasonic propagation cell means for scanning a light beam across said mask, means responsive to the variation in light transmitted by said mask for controlling the characteristic parameters of pulses emitted by the pulse emitting means, and means for sequentially scanning said mask with a light pattern corresponding to the energy reaching said receiving apparatus, whereby the output of said light responsive means during successive intervals represents the correlation function of the emitted and any returned pulses.

2. Apparatus in accordance with claim 1, in which said light-responsive means controls the carrier frequency parameter of the emitting means.

References Cited in the file of this patent

UNITED STATES PATENTS

| | | |
|---|---|---|
| 2,451,465 | Barney | Oct. 19, 1948 |
| 2,664,243 | Hurvitz | Dec. 29, 1953 |
| 2,768,372 | Green | Oct. 23, 1956 |
| 2,842,764 | Harvey | July 8, 1958 |

FOREIGN PATENTS

| | | |
|---|---|---|
| 724,555 | Great Britain | Feb. 23, 1955 |